United States Patent
Li (10) Patent No.: US 9,369,465 B2
(45) Date of Patent: Jun. 14, 2016

(54) SYSTEM FOR TRANSMITTING DATA BY USING USB INTERFACE

(71) Applicant: Tendyron Corporation, Beijing (CN)

(72) Inventor: Dongsheng Li, Beijing (CN)

(73) Assignee: Tendyron Corporation (CN)

( * ) Notice: Subject to any disclaimer, the term of this patent is extended or adjusted under 35 U.S.C. 154(b) by 0 days.

(21) Appl. No.: 14/434,912

(22) PCT Filed: Oct. 12, 2013

(86) PCT No.: PCT/CN2013/085095
§ 371 (c)(1),
(2) Date: Apr. 10, 2015

(87) PCT Pub. No.: WO2014/059904
PCT Pub. Date: Apr. 24, 2014

(65) Prior Publication Data
US 2015/0281226 A1  Oct. 1, 2015

(30) Foreign Application Priority Data
Oct. 15, 2012 (CN) .......................... 2012 1 0390949

(51) Int. Cl.
*G06F 21/34* (2013.01)
*H04L 29/06* (2006.01)
*G06F 13/38* (2006.01)

(52) U.S. Cl.
CPC ............ *H04L 63/0853* (2013.01); *G06F 13/38* (2013.01); *G06F 13/385* (2013.01); *G06F 21/34* (2013.01); *H04L 63/0815* (2013.01); *H04L 63/0876* (2013.01)

(58) Field of Classification Search
None
See application file for complete search history.

(56) References Cited

U.S. PATENT DOCUMENTS

2005/0108571 A1* 5/2005 Lu ........................... G06F 21/34
726/4
2005/0109841 A1* 5/2005 Ryan ..................... G06F 13/385
235/380

(Continued)

FOREIGN PATENT DOCUMENTS

CN       201114103 Y      9/2008
CN       201166864 Y      12/2008

(Continued)

OTHER PUBLICATIONS

International Search Report for Application No. PCT/CN2013/085095 dated Jan. 23, 2014.

*Primary Examiner* — David Pearson
(74) *Attorney, Agent, or Firm* — Lerner, David, Littenberg, Krumholz & Mentlik, LLP (57) ABSTRACT

A system for transmitting data by using a USB interface is provided. The system includes: a terminal equipment; a data transmission line, having a first terminal configured as a first USB interface and a second terminal configured as an interface adapted for connecting with the terminal equipment, and configured to transmit information from the terminal equipment directly; and an electronic signature token, including a second USB interface configured to be connected with the first USB interface to receive the information from the terminal equipment, a selecting module connected with the second USB interface and configured to detect the information received by the second USB interface and to determine a data transmission protocol type according to the information, and a modulating and demodulating module connected with the selecting module and configured to demodulate the information in a demodulation mode matched with the data transmission protocol type and to obtain demodulated data.

20 Claims, 3 Drawing Sheets

(56) References Cited

U.S. PATENT DOCUMENTS

2009/0049307 A1* 2/2009 Lin .................. G06F 21/72
                                              713/185
2010/0138572 A1* 6/2010 Rofougaran .......... G06F 13/385
                                              710/106

FOREIGN PATENT DOCUMENTS

| CN | 102929824 A | 2/2013 |
|---|---|---|
| CN | 102929825 A | 2/2013 |
| CN | 203070277 U | 7/2013 |
| CN | 203070278 U | 7/2013 |

* cited by examiner

SYSTEM FOR TRANSMITTING DATA BY USING USB INTERFACE

CROSS-REFERENCE TO RELATED APPLICATIONS

The present application is a national phase entry under 35 U.S.C. §371 of International Application No. PCT/CN2013/085095 filed Oct. 12, 2013, which claims priority from Chinese Patent Application No. 201210390949.8 filed Oct. 15, 2012 all of which are incorporated herein by reference.

FIELD

Embodiments of the present disclosure generally relate to an electronic technology field, and more particularly, to a system for transmitting data by using a USB interface.

BACKGROUND

With rapid developments of Internet, great convenience has been brought to people and they are more and more dependent on the Internet to carry out various activities, such as network file transmission and online banking which gradually become necessary parts of their lives and work. Since the Internet is a virtual environment, many insecurity factors exist in the Internet. However, Internet activities with data interaction, especially the Internet activities such as Internet banking services and secret file transmission, must be conducted in the Internet, and thus a high requirement for the Internet security is proposed and people start to develop the network information safety technology.

Digital signature technology is a network information safety technology which ensures that the user data that transmitted in the Internet cannot be modified maliciously. The said digital signature technology is an identity authentication technology which is used to transmit instructions and files safely. The digital signature technology processes the user data to be transmitted by a one-way function to obtain an alphanumetric string which is configured to authenticate a resource of the data and to verify whether the data has been modified. The digital signature technology usually calculates a digest value of the data to be transmitted by using a hash algorithm such as MD5 and SHA-1, and transmits an encrypted digest value after encrypting the digest value by an encryption algorithm. Currently, the digital signature technology usually adopts a public-key encryption technology, such as Public Key Cryptography Standards (PKCS), Digital Signature Algorithm, x.509 and Pretty Good Privacy (PGP) of RSA Date Security Corporation. National Institute of Standards and Technology published a digital signature standard in 1994, and thus the public-key encryption technology has been used widely. The digital signature in a digital document is similar to a written signature on a piece of paper and is unforgeable, and a receiver of the document can verify that the document indeed comes from a signer and the signed document has not been modified, such that authenticity and integrity of information in the received document can be ensured. A perfect digital signature technology should satisfy three requirements as follows: first, the signer cannot deny his own signature after the event; second, anyone cannot forge the signature; third, if both parties come into conflict about an authenticity of the signature, the authenticity of the signature can be determined by verifying the signature in front of a just intercessor.

After the data is signed, the security of the data can be improved greatly. However, developments of hacking technology still worry a user, as once a malicious attacker is in control of a computer of the user, he can intercept the data that appears in the computer memory, which causes damage to interests of a legitimate user of the computer. Therefore, people develop a portable and movable electronic signature token which is also known as a USB key. The electronic signature token is a small hardware device having a microprocessor, which establishes a connection with a host through a communication interface of the host. The microprocessor in the small hardware device is generally implemented by a safety chip which achieves functions of generating a key, storing the key and presetting the encryption algorithm by using a built-in security mechanism, such that calculations related to the key are totally performed in an authenticated device, and thus a high safety is provided.

However, the existing electronic signature token having a USB interface only can receive trade information transmitted by a terminal equipment via a USB transmission protocol, and can generate signature data and upload the signature data to the connected terminal equipment via the USB transmission protocol. Once a transmission protocol supported by the terminal equipment is a serial communication protocol or an audio transmission protocol and the terminal equipment sends the data supporting the above serial communication protocol or audio transmission protocol to the existing electronic signature token, the electronic signature token cannot process the data supporting other protocols other than the USB transmission protocol.

In addition, the terminal equipment only can use an interface of its own to transmit data consistent with the transmission protocol supported by the interface. When it is required for the electronic signature token having the USB interface to perform a data transmission with the terminal equipment and the transmission protocol supported by the electronic signature token is different from that supported by the terminal equipment, the terminal equipment cannot perform the data transmission with the electronic signature token due to limitations of the interface of the terminal equipment and the transmission protocol supported by the terminal equipment.

For example, a serial device (such as a POS machine) only has a serial interface, and when it is required for the electronic signature token having the USB interface to perform the data transmission with the serial device, the serial device cannot perform the data transmission with the electronic signature token, as the serial device does not have the USB interface and does not support the data transmitted via the USB transmission protocol. Thus, the use of the electronic signature token is limited.

Although a smartphone supports the USB transmission protocol, the smartphone only can be used as a slave USB device, and the electronic signature token having the USB interface also is the slave USB device, and thus the smartphone cannot perform a data interaction with the electronic signature token via the USB transmission protocol. If the smartphone intends to perform the data interaction with the electronic signature token having the USB interface via an audio transmission protocol, the electronic signature token having the USB interface cannot perform the data interaction with the smartphone via the USB interface, as the electronic signature token having the USB interface does not support other data transmission protocol types other than the USB transmission protocol.

SUMMARY

Embodiments of the present disclosure seek to solve at least one of the problems existing in the related art to at least some extent.

An objective of the present disclosure is to provide a system for transmitting data by using a USB interface.

In order to achieve the above objective, a technique solution of the present disclosure is implemented in a following manner.

Embodiments of a first aspect of the present disclosure provide a system for transmitting data by using a USB interface. The system includes: a terminal equipment; a data transmission line, having a first terminal configured as a first USB interface and a second terminal configured as an interface adapted for connecting with the terminal equipment, and configured to transmit information from the terminal equipment directly; and an electronic signature token, including: a second USB interface, configured to be connected with the first USB interface to receive the information from the terminal equipment; a security chip, connected with the second USB interface and configured to detect the information received by the second USB interface, to determine a data transmission protocol type used to transmit the information according to the information, to generate control information according to the data transmission protocol type, and to demodulate the received information using a demodulation mode matched with the data transmission protocol type to obtain demodulated data; a gate circuit, connected with the second USB interface and the security chip respectively and configured to receive the control information from a control terminal of the security chip and to connect the second USB interface with a modulating and demodulating terminal supporting the data transmission protocol type in the security chip according to the control information.

In addition, the security chip is further configured to modulate data to be sent using a modulation mode matched with the data transmission protocol type to obtain information to be sent and to transmit the information to be sent to the terminal equipment directly via the connected gate circuit and the data transmission line.

In addition, the security chip includes: a signing module, configured to sign the demodulated data to obtain the data to be sent, in which the data to be sent comprises signature data.

In addition, the security chip includes: a detecting module, configured to detect the information received by the second USB interface and to obtain a waveform of the information; a determining module, configured to determine the data transmission protocol type used to transmit the information according to the waveform of the information detected by the detecting module and to output the control information to the gate circuit via the control terminal according to the data transmission protocol type, in which the data transmission protocol type is a serial communication protocol, an audio transmission protocol or a USB transmission protocol. The serial communication protocol includes a serial full-duplex communication protocol and/or a serial half-duplex communication protocol.

In addition, the serial communication protocol may include the serial full-duplex communication protocol and the serial half-duplex communication protocol, the second USB interface includes a first signal transmission terminal and a second signal transmission terminal, the first signal transmission terminal is one of a D+ terminal and a D− terminal of the second USB interface and the second signal transmission terminal is the other one of the D+ terminal and the D− terminal of the second USB interface, and the determining module is further configured to determine a type of the serial communication protocol by determining whether one of the first signal transmission terminal and the second signal transmission terminal receives the control information, in which if one of the first signal transmission terminal and the second signal transmission terminal receives the control information and the other one of the first signal transmission terminal and the second signal transmission terminal receives data information, the serial communication protocol is determined as the serial half-duplex communication protocol; if one of the first signal transmission terminal and the second signal transmission terminal receives the data information but the other one of the first signal transmission terminal and the second signal transmission terminal does not receive the control information, the serial communication protocol is determined as the serial full-duplex communication protocol.

In addition, the serial communication protocol may be the serial half-duplex communication protocol, the interface adapted for connecting with the terminal equipment is a serial port, the data transmission line further comprises a first circuit connected with the serial port and the first USB interface respectively, the first USB interface comprises a first data transmission terminal and a second data transmission terminal, the first data transmission terminal is one of a D+ terminal and a D− terminal of the first USB interface and the second data transmission terminal is the other one of the D+ terminal and the D− terminal of the first USB interface; the serial port comprises a data sending terminal, a data receiving terminal and a control terminal, the data sending terminal and the data receiving terminal are connected to the first data transmission terminal via the first circuit, and the control terminal is connected to the second data transmission terminal via the first circuit.

In addition, the first circuit includes: a diode, having a positive electrode connected with the first data transmission terminal and a negative electrode connected with the data sending terminal; a first pull-up resistor, having a first terminal connected with a high level and a second terminal connected with the first data transmission terminal; a second pull-up resistor, having a first terminal connected with a high level; and a current-limiting resistor, having a first terminal connected with the control terminal of the serial port and a second terminal of the second pull-up resistor respectively, and a second terminal connected with the second data transmission terminal.

In addition, the serial communication protocol may be the serial full-duplex communication protocol, and the interface adapted for connecting with the terminal equipment is a serial port; the serial port comprises a sending terminal and a receiving terminal, the first USB interface comprises a first data transmission terminal and a second data transmission terminal, the first data transmission terminal is one of a D+ terminal and a D− terminal of the first USB interface and the second data transmission terminal is the other one of the D+ terminal and the D− terminal of the first USB interface; the sending terminal is connected with the first data transmission terminal, and the receiving terminal is connected with the second data transmission terminal.

In addition, when the data transmission protocol type is the audio transmission protocol, the interface adapted for connecting with the terminal equipment is an audio interface, the data transmission line further comprises a second circuit connected with the audio interface and the first USB interface respectively; the audio interface comprises a channel output terminal and a microphone terminal, the first USB interface comprises a first data transmission terminal and a second data transmission terminal, the first data transmission terminal is one of a D+ terminal and a D− terminal of the first USB interface and the second data transmission terminal is the other one of the D+ terminal and the D− terminal of the first USB interface; the channel output terminal is configured to receive audio information from the terminal equipment, and the second circuit is configured to amplify the audio information sent from the terminal equipment and to transmit amplified audio information to the first data transmitting terminal; the second data transmission terminal is configured to receive audio information from the electronic signature token, and the second circuit is configured to attenuate the audio information sent from the electronic signature token and to transmit attenuated audio information to the microphone terminal.

In addition, the gate circuit includes at least two gate sub-circuits and each gate sub-circuit comprises two controllable switches, and a controlled terminal of the controllable switch is connected with the control terminal of the security chip.

In addition, the security chip further comprises modulating and demodulating modules connected with the gate sub-circuits respectively via the modulating and demodulating terminal, each modulating and demodulating module supports different data transmission protocol types, in which the data transmission protocol type comprises the serial full-duplex communication protocol, the serial half-duplex communication protocol, the audio transmission protocol and the USB transmission protocol.

Embodiments of a second aspect of the present disclosure provide a system for transmitting data by using a USB interface. The system includes: a terminal equipment; a data transmission line, having a first terminal configured as a first USB interface and a second terminal configured as an interface adapted for connecting with the terminal equipment, and configured to transmit information from the terminal equipment directly; and an electronic signature token, including: a second USB interface, configured to be connected with the first USB interface to receive the information from the terminal equipment; a selecting module, connected with the second USB interface and configured to detect the information received by the second USB interface and to determine a data transmission protocol type used to transmit the information according to the information; a modulating and demodulating module, connected with the selecting module and configured to demodulate the information in a demodulation mode matched with the data transmission protocol type and to obtain demodulated data;

In addition, the modulating and demodulating module is further configured to modulate data to be sent using a modulation mode matched with the data transmission protocol type to obtain information to be sent and to transmit the information to be sent to the terminal equipment directly via the data transmission line.

In addition, the electronic signature token further includes: a signing module, configured to sign the demodulated data to obtain the data to be sent, in which the data to be sent comprises signature data.

In addition, the selecting module includes: a detecting unit, configured to detect a waveform of the information; a determining unit, configured to determine the data transmission protocol type used to transmit the information according to the waveform of the information detected by the detecting module, in which the data transmission protocol type is a serial communication protocol, an audio transmission protocol or a USB transmission protocol. The serial communication protocol includes a serial full-duplex communication protocol and/or a serial half-duplex communication protocol.

In addition, the serial communication protocol may include the serial full-duplex communication protocol and the serial half-duplex communication protocol, the second USB interface includes a first signal transmission terminal and a second signal transmission terminal, the first signal transmission terminal is one of a D+ terminal and a D− terminal of the second USB interface and the second signal transmission terminal is the other one of the D+ terminal and the D− terminal of the second USB interface, and the determining unit is further configured to determine a type of the serial communication protocol by determining whether one of the first signal transmission terminal and the second signal transmission terminal receives the control information, in which if one of the first signal transmission terminal and the second signal transmission terminal receives the control information and the other one of the first signal transmission terminal and the second signal transmission terminal receives data information, the serial communication protocol is determined as the serial half-duplex communication protocol; if one of the first signal transmission terminal and the second signal transmission terminal receives data information but the other one of the first signal transmission terminal and the second signal transmission terminal does not receive the control information, the serial communication protocol is determined as the serial full-duplex communication protocol.

In addition, the serial communication protocol may be the serial half-duplex communication protocol, the interface adapted for connecting with the terminal equipment is a serial port, and the data transmission line further includes a first circuit connected with the serial port and the first USB interface respectively; the serial port includes a data sending terminal, a data receiving terminal and a control terminal, the first USB interface includes a first data transmission terminal and a second data transmission terminal, the first data transmission terminal is one of a D+ terminal and a D− terminal of the first USB interface and the second data transmission terminal is the other one of the D+ terminal and the D− terminal of the first USB interface; the data sending terminal and the data receiving terminal are connected to the first data transmission terminal via the first circuit; the control terminal is connected to the second data transmission terminal via the first circuit.

In addition, the first circuit includes: a diode, having a positive electrode connected with the first data transmission terminal and a negative electrode connected with the data sending terminal; a first pull-up resistor, having a first terminal connected with a high level and a second terminal connected with the first data transmission terminal; a second pull-up resistor, having a first terminal connected with a high level; and a current-limiting resistor, having a first terminal connected with the control terminal of the serial port and a second terminal of the second pull-up resistor respectively, and a second terminal connected with the second data transmission terminal.

In addition, the serial communication protocol may be the serial full-duplex communication protocol, and the interface adapted for connecting with the terminal equipment is a serial port; the serial port comprises a sending terminal and a receiving terminal, the first USB interface comprises a first data transmission terminal and a second data transmission terminal, the first data transmission terminal is one of a D+ terminal and a D− terminal of the first USB interface and the second data transmission terminal is the other one of the D+ terminal and the D− terminal of the first USB interface; the sending terminal is connected with the first data transmission terminal, and the receiving terminal is connected with the second data transmission terminal.

In addition, when the data transmission protocol type is the audio transmission protocol, the second terminal of the data transmission line connected with the terminal equipment is an audio interface, and the data transmission line further comprises a second circuit connected with the audio interface and the first USB interface respectively; the audio interface comprises a channel output terminal and a microphone terminal, the first USB interface comprises a first data transmission terminal and a second data transmission terminal, the first data transmission terminal is one of a D+ terminal and a D− terminal of the first USB interface and the second data transmission terminal is the other one of the D+ terminal and the D− terminal of the first USB interface; the channel output terminal is configured to receive audio information from the terminal equipment, and the second circuit is configured to amplify the audio information sent from the terminal equipment and to transmit amplified audio information to the first data transmission terminal; the second data transmission terminal is configured to receive audio information from the electronic signature token, and the second circuit is configured to attenuate the audio information sent from the electronic signature token and to transmit attenuated audio information to the microphone terminal.

In addition, the modulating and demodulating module includes at least two modulating and demodulating units, and each modulating and demodulating unit supports different data transmission protocol types, in which the data transmission protocol types include the serial full-duplex communication protocol, the serial half-duplex communication protocol, the audio transmission protocol and the USB transmission protocol.

Embodiments of a third aspect of the present disclosure provide a system for transmitting data by using a USB interface. The system includes a terminal equipment, a data transmission line and an electronic signature token. The data transmission line has a first terminal configured as a first USB interface and connected with the electronic signature token, and a second terminal connected with the terminal equipment and configured to transmit information from the terminal equipment to the electronic signature token directly. The electronic signature token includes a second USB interface, a gate circuit connected with the second USB interface and a security chip connected with the second USB interface and the gate circuit respectively. The second USB interface is configured to receive the information. The security chip is configured to detect the information received by the second USB interface, to determine a data transmission protocol type used to transmit the information according to the information, to control the gate circuit according to the data transmission protocol type, and to demodulate the received information using a demodulation mode matched with the data transmission protocol type to obtain demodulated data. The gate circuit is configured to receive control information from a control terminal of the security chip and to connect the second USB interface with a modulating and demodulating terminal supporting the data transmission protocol type in the security chip according to the control information.

In addition, the security chip is further configured to modulate data to be sent using a modulation mode matched with the data transmission protocol type to obtain information to be sent and to transmit the information to be sent to the terminal equipment directly via the connected gate circuit and the data transmission line.

In addition, the security chip includes: a signing module, configured to sign the demodulated data to obtain the data to be sent, in which the data to be sent includes signature data.

In addition, the security chip includes a detecting module and a determining module. The detecting module is configured to detect the information received by the second USB interface and to obtain a waveform of the information. The determining module is configured to determine the data transmission protocol type used to transmit the information according to the waveform of the information detected by the detecting module and to output the control information to the gate circuit via the control terminal according to the data transmission protocol type, in which the data transmission protocol type is a serial communication protocol, an audio transmission protocol or a USB transmission protocol.

In addition, the security chip includes a detecting module and a determining module. The detecting module is configured to detect the information received by the second USB interface and to obtain a waveform of the information. The determining module is configured to determine the data transmission protocol type used to transmit the information according to the waveform of the information detected by the detecting module and to output the control information to the gate circuit via the control terminal according to the data transmission protocol type, in which the data transmission protocol type is a serial half-duplex communication protocol, an audio transmission protocol or a USB transmission protocol.

In addition, the second terminal of the data transmission line connected with the terminal equipment is a serial port, and the data transmission line further includes a first circuit connected with the serial port and the first USB interface respectively. The serial port includes a data sending terminal Tx, a data receiving terminal Rx and a control terminal RST, the first USB interface includes a first data transmission terminal and a second data transmission terminal, the data sending terminal Tx and the data receiving terminal Rx are connected to the first data transmission terminal via the first circuit, and the control terminal RST is connected to the second data transmission terminal via the first circuit. The first data transmission terminal is one of a D+ terminal and a D− terminal of the first USB interface and the second data transmission terminal is the other one of the D+ terminal and the D− terminal of the first USB interface.

In addition, the first circuit includes a diode, a first pull-up resistor, a second pull-up resistor and a current-limiting resistor. The diode has a positive electrode connected with the first data transmission terminal and a negative electrode connected with the data sending terminal Tx. The first pull-up resistor has a first terminal connected with a high level and a second terminal connected with the first data transmission terminal. The second pull-up resistor has a first terminal connected with a high level and a second terminal connected with the second data transmission terminal via the current-limiting resistor.

In addition, the security chip includes a detecting module and a determining module. The detecting module is configured to detect the information received by the second USB interface and to obtain a waveform of the information, and the determining module is configured to determine the data transmission protocol type used to transmit the information according to the waveform of the information detected by the detecting module and to output the control information to the gate circuit via the control terminal according to the data transmission protocol type, in which the data transmission protocol type is a serial full-duplex communication protocol, an audio transmission protocol or a USB transmission protocol.

In addition, the second terminal of the data transmission line connected with the terminal equipment is a serial port, the serial port includes a sending terminal Tx and a receiving terminal Rx, the first USB interface includes a first data transmission terminal and a second data transmission terminal, the sending terminal Tx is connected with the first data transmission terminal, and the receiving terminal Rx is connected with the second data transmission terminal. The first data transmission terminal is one of a D+ terminal and a D− terminal of the first USB interface and the second data transmission terminal is the other one of the D+ terminal and the D− terminal of the first USB interface.

In addition, the serial communication protocol includes the serial full-duplex communication protocol and the serial half-duplex communication protocol, the second USB interface includes a first signal transmission terminal and a second signal transmission terminal, and the determining module is further configured to determine a type of the serial communication protocol by determining whether one of the first signal transmission terminal and the second signal transmission terminal receives the control information RST, in which if one of the first signal transmission terminal and the second signal transmission terminal receives the control information RST and the other one of the first signal transmission terminal and the second signal transmission terminal receives data information, the serial communication protocol is determined as the serial half-duplex communication protocol and the control information is output to the gate circuit via the control terminal; if one of the first signal transmission terminal and the second signal transmission terminal receives the data information but the other one of the first signal transmission terminal and the second signal transmission terminal does not receive the control information RST, the serial communication protocol is determined as the serial full-duplex communication protocol and the control information is output to the gate circuit via the control terminal. The first signal transmission terminal is one of a D+ terminal and a D− terminal of the second USB interface and the second signal transmission terminal is the other one of the D+ terminal and the D− terminal of the second USB interface.

In addition, when the data transmission protocol type is the audio transmission protocol, the second terminal of the data transmission line connected with the terminal equipment is an audio interface, and the data transmission line further includes a second circuit connected with the audio interface and the first USB interface respectively. The audio interface includes a channel output terminal and a microphone terminal, the first USB interface includes a first data transmission terminal and a second data transmission terminal. The channel output terminal is configured to receive audio information from the terminal equipment, and the second circuit is configured to amplify the audio information sent from the terminal equipment and to transmit amplified audio information to the first data transmitting terminal. The second data transmission terminal is configured to receive audio information from the electronic signature token, and the second circuit is configured to attenuate the audio information sent from the electronic signature token and to transmit attenuated audio information to the microphone terminal. The first data transmission terminal is one of a D+ terminal and a D− terminal of the first USB interface and the second data transmission terminal is the other one of the D+ terminal and the D− terminal of the first USB interface.

In addition, the gate circuit includes at least two gate sub-circuits and each gate sub-circuit includes two controllable switches, and a controlled terminal of the controllable switch is connected with the control terminal of the security chip.

In addition, the security chip further includes modulating and demodulating modules connected with the gate sub-circuits respectively via the modulating and demodulating terminal, and each modulating and demodulating module supports different data transmission protocol types, in which the data transmission protocol types include the serial full-duplex communication protocol, the serial half-duplex communication protocol, the audio transmission protocol and the USB transmission protocol.

Embodiments of a fourth aspect of the present disclosure provide a system for transmitting data by using a USB interface. The system includes a terminal equipment, a data transmission line and an electronic signature token. The data transmission line has a first terminal configured as a first USB interface and connected with the electronic signature token, and a second terminal connected with the terminal equipment and configured to transmit information from the terminal equipment to the electronic signature token directly. The electronic signature token includes a second USB interface, a selecting module connected with the second USB interface and a modulating and demodulating module connected with selecting module. The second USB interface is configured to receive the information. The selecting module is configured to detect the information received by the second USB interface, and to determine a data transmission protocol type used to transmit the information according to the information. The modulating and demodulating module is configured to demodulate the received information using a demodulation mode matched with the data transmission protocol type to obtain demodulated data.

In addition, the modulating and demodulating module is further configured to modulate data to be sent using a modulation mode matched with the data transmission protocol type to obtain information to be sent and to transmit the information to be sent to the terminal equipment directly via the data transmission line.

In addition, the electronic signature token further includes: a signing module, configured to sign the demodulated data to obtain the data to be sent, in which the data to be sent includes signature data.

In addition, the selecting module includes a detecting unit and a determining unit. The detecting unit is configured to detect a waveform of the information, and the determining unit is configured to determine the data transmission protocol type used to transmit the information according to the waveform of the information detected by the detecting unit, in which the data transmission protocol type is a serial communication protocol, an audio transmission protocol or a USB transmission protocol.

In addition, the selecting module includes a detecting unit and a determining unit. The detecting unit is configured to detect a waveform of the information, and the determining unit is configured to determine the data transmission protocol type used to transmit the information according to the waveform of the information detected by the detecting unit, in which the data transmission protocol type is a serial half-duplex communication protocol, an audio transmission protocol or a USB transmission protocol.

In addition, the second terminal of the data transmission line connected with the terminal equipment is a serial port, and the data transmission line further includes a first circuit connected with the serial port and the first USB interface respectively. The serial port includes a data sending terminal Tx, a data receiving terminal Rx and a control terminal RST, the first USB interface includes a first data transmission terminal and a second data transmission terminal, the data sending terminal Tx and the data receiving terminal Rx are connected to the first data transmission terminal via the first circuit, and the control terminal RST is connected to the second data transmission terminal via the first circuit. The first data transmission terminal is one of a D+ terminal and a D− terminal of the first USB interface and the second data transmission terminal is the other one of the D+ terminal and the D− terminal of the first USB interface.

In addition, the first circuit includes a diode, a first pull-up resistor, a second pull-up resistor and a current-limiting resistor. The diode has a positive electrode connected with the first data transmission terminal and a negative electrode connected with the data sending terminal Tx, the first pull-up resistor has a first terminal connected with a high level and a second terminal connected with the first data transmission terminal, and the second pull-up resistor has a first terminal connected with a high level and a second terminal connected with the second data transmission terminal via the current-limiting resistor.

In addition, the selecting module includes a detecting unit and a determining unit. The detecting unit is configured to detect a waveform of the information, and the determining unit is configured to determine the data transmission protocol type used to transmit the information according to the waveform of the information detected by the detecting unit, in which the data transmission protocol type is a serial full-duplex communication protocol, an audio transmission protocol or a USB transmission protocol.

In addition, the second terminal of the data transmission line connected with the terminal equipment is a serial port, the serial port includes a sending terminal Tx and a receiving terminal Rx, the first USB interface includes a first data transmission terminal and a second data transmission terminal, the sending terminal Tx is connected with the first data transmission terminal, and the receiving terminal Rx is connected with the second data transmission terminal. The first data transmission terminal is one of a D+ terminal and a D− terminal of the first USB interface and the second data transmission terminal is the other one of the D+ terminal and the D− terminal of the first USB interface.

In addition, the serial communication protocol includes the serial full-duplex communication protocol and the serial half-duplex communication protocol, the second USB interface includes a first signal transmission terminal and a second signal transmission terminal, and the determining unit is further configured to determine a type of the serial communication protocol by determining whether one of the first signal transmission terminal and the second signal transmission terminal receives the control information RST, in which if one of the first signal transmission terminal and the second signal transmission terminal receives the control information RST and the other one of the first signal transmission terminal and the second signal transmission terminal receives data information, the serial communication protocol is determined as the serial half-duplex communication protocol; if one of the first signal transmission terminal and the second signal transmission terminal receives the data information and the other one of the first signal transmission terminal and the second signal transmission terminal does not receive the control information RST, the serial communication protocol is determined as the serial full-duplex communication protocol. The first signal transmission terminal is one of a D+ terminal and a D− terminal of the second USB interface and the second signal transmission terminal is the other one of the D+ terminal and the D− terminal of the second USB interface.

In addition, when the data transmission protocol type is the audio transmission protocol, the second terminal of the data transmission line connected with the terminal equipment is an audio interface, the data transmission line further includes a second circuit connected with the audio interface and the first USB interface respectively, the audio interface includes a channel output terminal and a microphone terminal, and the first USB interface includes a first data transmission terminal and a second data transmission terminal. The channel output terminal is configured to receive audio information from the terminal equipment, and the second circuit is configured to amplify the audio information sent from the terminal equipment and to transmit amplified audio information to the first data transmission terminal. The second data transmission terminal is configured to receive audio information from the electronic signature token, and the second circuit is configured to attenuate the audio information sent from the electronic signature token and to transmit attenuated audio information to the microphone terminal. The first data transmission terminal is one of a D+ terminal and a D− terminal of the first USB interface and the second data transmission terminal is the other one of the D+ terminal and the D− terminal of the first USB interface.

In addition, the modulating and demodulating module includes at least two modulating and demodulating units, and each modulating and demodulating unit supports different data transmission protocol types, in which the data transmission protocol types include the serial full-duplex communication protocol, the serial half-duplex communication protocol, the audio transmission protocol and the USB transmission protocol.

It can be seen from technique solutions provided by above embodiments of the present disclosure that, in the system for transmitting data by using a USB interface according to embodiments of the present disclosure, with the data transmission line and by using the second USB interface of the electronic signature token, data supporting different transmission protocols is transmitted to the electronic signature token via the second USB interface, and by detecting the signals at the D+ terminal and the D− terminal of the second USB interface to determine the used data transmission protocol type and demodulating the received data using the data transmission protocol type, the demodulated data is obtained without a complex protocol conversion, and thus the data supporting different transmission protocols can be transmitted by using the USB interface. With the system according to embodiments of the present disclosure, a cost and a complexity of the hardware are reduced, a structure is simplified and it is convenient to implement.

BRIEF DESCRIPTION OF THE DRAWINGS

In order to make technique solutions according to embodiments of the present disclosure more apparent, drawings needed to be used in descriptions of the embodiments will be illustrated in the following. Obviously, the drawings to be illustrated in the following only represent some embodiments of the present disclosure, and other drawings can be obtained according these drawings by those having ordinary skills in the related art without making creative labors.

DETAILED DESCRIPTION

The technique solution in embodiments of the present disclosure will be described in the following with reference to drawings in the embodiments of the present disclosure. Obviously, the embodiments to be described only are some embodiments of the present disclosure, instead of all the embodiments thereof. Based on embodiments of the present disclosure, other embodiments obtained by those having ordinary skills in the related art without making creative labors fall into a protection scope of the present disclosure.

In the description of the present disclosure, it is to be understood that relative terms such as "central", "longitudinal", "lateral", "up", "down", "front", "rear", "right", "left", "vertical", "horizontal", "bottom", "top", "inner", "outer" as well as derivative thereof should be construed to refer to the orientation as then described or as shown in the drawings under discussion for simplifying the description of the present disclosure, but do not alone indicate or imply that the device or element referred to must have a particular orientation. Moreover, it is not required that the present disclosure is constructed or operated in a particular orientation, and thus embodiments of the present disclosure are not limited to these. In addition, In addition, terms such as "first" and "second" are used herein for purposes of description and are not intended to indicate or imply relative importance or significance.

In the description of the present disclosure, unless specified or limited otherwise, it should be noted that, terms "mounted," "connected" and "coupled" may be understood broadly, such as permanent connection or detachable connection, electronic connection or mechanical connection, direct connection or indirect connection via intermediary, inner communication or interreaction between two elements. These having ordinary skills in the art should understand the specific meanings in the present disclosure according to specific situations.

Embodiments of the present disclosure will be described in the following with reference to the drawings.

Figure 1:
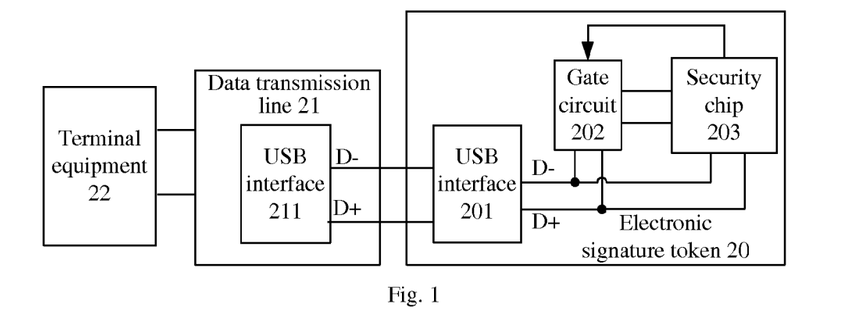
FIG. 1 is a schematic diagram showing a first embodiment of a system for transmitting data by using a USB interface according to the present disclosure.

FIG. 1 is a schematic diagram showing a first embodiment of a system for transmitting data by using a USB interface according to the present disclosure. With reference to FIG. 1, the first embodiment of the system for transmitting data by using a USB interface according to the present disclosure will be described as follows.

The system for transmitting data by using a USB interface includes a terminal equipment 22, a data transmission line 21 and an electronic signature token 20.

The data transmission line 21 has a first terminal configured as a first USB interface 211 and connected with the electronic signature token 20 and a second terminal connected with the terminal equipment 22. The data transmission line 21 is configured to transmit information from the terminal equipment 22 to the electronic signature token 20 directly and to transmit information from the electronic signature token 20 to the terminal equipment 22 directly. While transmitting the information, the data transmission line 21 does not perform a protocol conversion on the information, but directly transmit the information via data lines connected with corresponding interfaces therein. The second terminal of the data transmission line 21 connected with the terminal equipment 22 may be configured as an interface matched with an interface of the terminal equipment 22.

The electronic signature token 20 includes a second USB interface 201, a gate circuit 202 connected with the second USB interface 201, and a security chip 203 connected with the second USB interface 201 and the gate circuit 202 respectively. The second USB interface 201 of the electronic signature token 20 is matched with the first USB interface 211 of the data transmission line 21, for example, a D− terminal of the second USB interface 201 of the electronic signature token 20 is connected with a D− terminal of the first USB interface 211 of the data transmission line 21, and a D+ terminal of the second USB interface 201 of the electronic signature token 20 is connected with a D+ terminal of the first USB interface 211 of the data transmission line 21.

The security chip 203 is configured to detect the information received by the second USB interface 201, to determine a data transmission protocol type used to transmit the information according to detected information, to control the gate circuit 202 according to the data transmission protocol type, and to demodulate the received information using a demodulation mode matched with the data transmission protocol type to obtain demodulated data, in which the security chip 203 includes a control terminal configured to output the control information and a demodulating and modulating terminal configured to receive a signal to be demodulated.

The gate circuit 202 is configured to receive the control information from the control terminal (not shown in FIG. 1) of the security chip 203 and to connect the second USB interface 201 with the modulating and demodulating terminal (not shown in FIG. 1) supporting the data transmission protocol type in the security chip 203 according to the control information.

In addition, after determining the used data transmission protocol type, the security chip 203 according to embodiments of the present disclosure modulates data to be sent using a modulation mode matched with the data transmission protocol type to obtain information to be sent and transmits the information to be sent to the terminal equipment 22 directly via the connected gate circuit 202 and the data transmission line 21. The data to be sent may be data that is obtained by signing the demodulated data with the security chip 203. That is, the data to be sent at least includes signature data obtained by signing the demodulated data, and may further include other key information which is not enumerated herein. The data to be sent may be a request carrying identity information or identification information and generated inside the electronic signature token 20.

Figure 2:
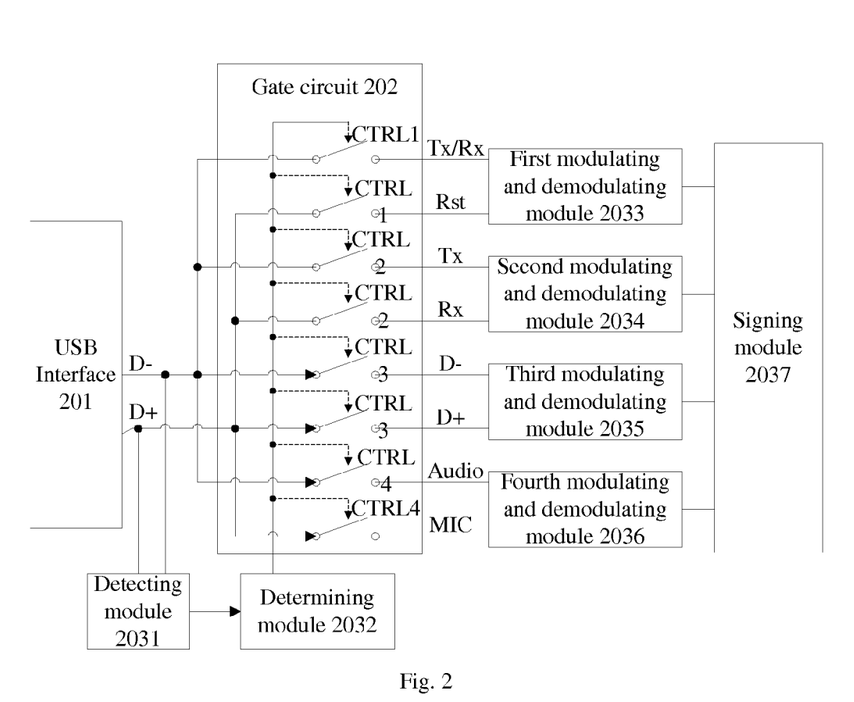
FIG. 2 is a schematic diagram showing a first embodiment of an electronic signature token according to the present disclosure.

FIG. 2 is a schematic diagram showing a first embodiment of an electronic signature token according to the present disclosure. With reference to FIG. 2, the first embodiment of the electronic signature token according to the present disclosure will be described as follows.

In this embodiment, by using the USB interface, the electronic signature token 20 can receive data transmitted in four kinds of data transmission protocol types and can demodulate the data. The four kinds of data transmission protocol types include a serial full-duplex communication protocol, a serial half-duplex communication protocol, an audio transmission protocol and a USB transmission protocol.

The electronic signature token 20 in the first embodiment includes a second USB interface 201, a gate circuit 202 and a security chip (not shown in FIG. 2). The security chip at least includes a detecting module 2031 and a determining module 2032, and the second USB interface 201 includes two signal transmission terminals such as a D− terminal and a D+ terminal in FIG. 2, in which one of the D− terminal and the D+ terminal may be referred as a first signal transmission terminal and the other one of the D− terminal and the D+ terminal may be referred as a second signal transmission terminal.

The detecting module 2031 is configured to detect the information received by the second USB interface 201, to obtain a waveform of the information and to output the waveform of the information to the determining module 2032. The detecting module 2031 detects the information output from the two signal transmission terminals of the second USB interface 201.

The determining module 2032 is configured to determine the data transmission protocol type used to transmit the information according to the waveform of the information detected by the detecting module 2031 and to output the control information to the gate circuit 202 via the controlling terminal (not shown in FIG. 2) according to the data transmission protocol type. In the embodiment, the data transmission protocol type may be a serial communication protocol, an audio transmission protocol or a USB transmission protocol. Specifically, if the determining module 2032 determines that the waveform of the information is a triangular wave (such as a sine wave or a cosine wave), it is determined that the used data transmission protocol type is the audio transmission protocol and a control signal such as a control signal CTRL4 is output to the gate circuit 202 by the control terminal; if the determining module 2032 determines that the waveform of the information is a square wave, a bit rate of the square wave is further detected, and if the bit rate of the square wave is between 9600 bps and 19200 bps, it is determined that the used data transmission protocol type is the serial communication protocol and a control signal such as a control signal CTRL1 or CTRL2 is output to the gate circuit 202 by the control terminal; if the bit rate of the square wave is more than or equal to 100 kbps or beyond a range from 9600 bps to 19200 bps, it is determined that the used data transmission protocol type is the USB transmission protocol and a control signal such as a control signal CTRL3 is output to the gate circuit 202 by the control terminal.

After determining that the used data transmission protocol type is the serial communication protocol, the determining module 2032 further determines a type of the serial communication protocol by determining whether one of the two signal transmission terminals of the second USB interface 201 receives the control information RST. For example, if the determining module 2032 determines that one of the two signal transmission terminals of the second USB interface 201 receives the control information RST and the other one of the two signal transmission terminals receives data information, the used data transmission protocol type is determined as the serial half-duplex communication protocol, and the control information is output to the gate circuit 202 by the control terminal so as to connect the second USB interface 201 with the modulating and demodulating terminal (not shown in FIG. 2) supporting the serial half-duplex communication protocol in the security chip 203, for example, the control signal CTRL1 is output; if the determining module 2032 determines that one of the two signal transmission terminals receives the data information but the other one of the two signal transmission terminals does not receive the control information RST, the used data transmission protocol type is determined as the serial full-duplex communication protocol, and the control information such as the control signal CRTL2 is output to the gate circuit 202 by the control terminal.

A first modulating and demodulating module 2033 supports the serial half-duplex communication protocol, demodulates data information transmitted via a connected circuit branch of the gate circuit 202 to obtain the demodulated data and outputs the demodulated data to the signing module 2037 for signing. The first modulating and demodulating module 2033 may also modulate the signature data output by the signing module 2037 to obtain the information to be sent, and transmit the information to the data transmission line 21 connected with the second USB interface 201 via the connected circuit branch of the gate circuit 202. Then, the information is further transmitted to the terminal equipment 22 directly.

A second modulating and demodulating module 2034 supports the serial full-duplex communication protocol, demodulates data information transmitted via the connected circuit branch of the gate circuit 202 to obtain the demodulated data and outputs the demodulated data to the signing module 2037 for signing. The second modulating and demodulating module 2034 may also modulate the signature data output by the signing module 2037 to obtain the information to be sent, and transmit the information to the data transmission line 21 connected with the second USB interface 201 via the connected circuit branch of the gate circuit 202. Then, the information is further transmitted to the terminal equipment 22 directly.

A third modulating and demodulating module 2035 supports the USB transmission protocol, demodulates data information transmitted via the connected circuit branch of the gate circuit 202 to obtain the demodulated data and outputs the demodulated data to the signing module 2037 for signing. The third modulating and demodulating module 2035 may also modulate the signature data output by the signing module 2037 to obtain the information to be sent, and transmit the information to the data transmission line 21 connected with the second USB interface 201 via the connected circuit branch of the gate circuit 202. Then, the information is further transmitted to the terminal equipment 22 directly.

A fourth modulating and demodulating module 2036 supports the audio transmission protocol, demodulates data information transmitted via a connected circuit branch of the gate circuit 202 to obtain the demodulated data and outputs the demodulated data to the signing module 2037 for signing. The fourth modulating and demodulating module 2036 may also modulate the signature data output by the signing module 2037 to obtain the information to be sent, and transmit the information to the data transmission line 21 connected with the second USB interface 201 via the connected circuit branch of the gate circuit 202. Then, the information is further transmitted to the terminal equipment 22 directly.

The signing module 2037 is configured to sign the demodulated data to obtain the signature data and to output the signature data to the corresponding modulating and demodulating module.

The security chip includes four modulating and demodulating modules corresponding to four data transmission protocol types respectively, the gate circuit 202 includes four gate sub-circuits, and each gate sub-circuits is connected with one modulating and demodulating module and receives same information from the control terminal of the determining module 2032. As shown in FIG. 2, each gate sub-circuit includes two controllable switches, and the controllable switches belonging to a same gate sub-circuit receive the same control information from the determining module 2032. For example, the two controllable switches connected with the first modulating and demodulating module 2033 and configured to receive the control information CTRL1 belong to the same gate sub-circuit, the two controllable switches connected with the second modulating and demodulating module 2034 and configured to receive the control information CTRL2 belong to the same gate sub-circuit, the two controllable switches connected with the third modulating and demodulating module 2035 and configured to receive the control information CTRL3 belong to the same gate sub-circuit, and the two controllable switches connected with the fourth modulating and demodulating module 2036 and configured to receive the control information CTRL4 belong to the same gate sub-circuit.

In a second embodiment of the electronic signature token, the electronic signature token may use the USB interface and process the data transmitted in the serial half-duplex communication protocol, the audio transmission protocol and the USB transmission protocol. Specifically, a difference between the electronic signature token in the second embodiment and the electronic signature token in the first embodiment as shown in FIG. 2 is that, the electronic signature token in the second embodiment does not include the second modulating and demodulating module 2034 and the gate sub-circuit connected with the second modulating and demodulating module 2034 in the gate circuit 202. Other parts of the electronic signature token in the second embodiment are the same with those of the electronic signature token in the first embodiment, which will not be described in detail herein. It should be understood that, since the electronic signature token in the second embodiment only supports the serial half-duplex communication protocol and does not support the serial full-duplex communication protocol, when it is determined that the data transmission protocol type is the serial communication protocol, it can be directly determined that the data transmission protocol type is the serial half-duplex communication protocol and the gate sub-circuit connected with the first modulating and demodulating module 2033 is switched on, without determining the type of the serial communication protocol by determining whether one of the two signal transmission terminals receives the control information.

In a third embodiment of the electronic signature token, the electronic signature token may use the USB interface and process the data transmitted in the serial full-duplex communication protocol, the audio transmission protocol and the USB transmission protocol. Specifically, a difference between the electronic signature token in the third embodiment and the electronic signature token in the first embodiment as shown in FIG. 2 is that, the electronic signature token in the third embodiment does not include the first modulating and demodulating module 2033 and the gate sub-circuit connected with the first modulating and demodulating module 2033 in the gate circuit 202. Other parts of the electronic signature token in the third embodiment are the same with those of the electronic signature token in the first embodiment, which will not be described in detail herein. It should be understood that, since the electronic signature token in the third embodiment only supports the serial full-duplex communication protocol and does not support the serial half-duplex communication protocol, when it is determined that the data transmission protocol type is the serial communication protocol, it can be directly determined that the data transmission protocol type is the serial full-duplex communication protocol and the gate sub-circuit connected with the second modulating and demodulating module 2034 is switched on, without determining the type of the serial communication protocol by determining whether one of the two signal transmission terminals receives the control information.

In following embodiments, the electronic signature token may use the USB interface and process the data transmitted in any two kinds of transmission protocols from the serial full-duplex communication protocol, the serial half-duplex communication protocol, the audio transmission protocol and the USB transmission protocol. Specifically, a difference between the electronic signature token in each of these embodiments and the electronic signature token in the first embodiment as shown in FIG. 2 is that, the electronic signature token according to these embodiments includes the second USB interface 201, the detecting module 2031, the determining module 2032, the signing module 2037, two modulating and demodulating modules supporting corresponding protocols and gate sub-circuits connected with the corresponding modulating and demodulating modules in the gate circuit 202, the connection relationship between which are the same with that shown in FIG. 2, and will not be described in detail herein.

Figure 3:
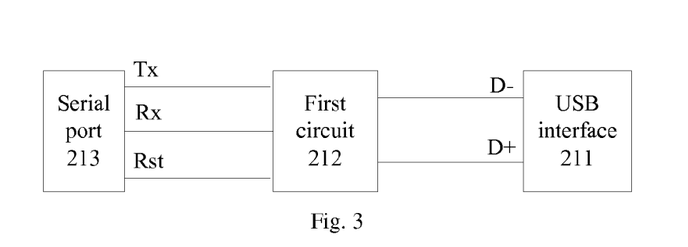
FIG. 3 is a schematic diagram showing a first embodiment of a data transmission line according to the present disclosure.

FIG. 3 is a schematic diagram showing a first embodiment of a data transmission line according to the present disclosure. With reference to FIG. 3, the first embodiment of the data transmission line according to the present disclosure will be described as follows.

In the first embodiment of the data transmission line 21, the second terminal of the data transmission line 21 connected with the terminal equipment 22 is a serial port 213, and the data information and control information output from the terminal equipment 22 to the serial port 213 is in consistent with the serial half-duplex communication protocol, i.e., the data information is transmit-received via Tx/Rx and the control information is transmit-received via Rst.

In the first embodiment of the data transmission line 21, the data transmission line 21 includes the serial port 213 connected with the terminal equipment 22, the first USB interface 211 connected with the electronic signature token 20 and a first circuit 212 connected with the serial port 213 and the first USB interface 211 respectively. The serial port 213 includes a data sending terminal Tx, a data receiving terminal Rx and a control terminal RST. The data sending terminal Tx and the data receiving terminal Rx in the serial port 213 are connected to the Tx/Rx of the terminal equipment 22, and the control terminal RST in the serial port 213 is connected to the Rst of the terminal equipment 22. The first USB interface 211 includes a first data transmission terminal and a second data transmission terminal, the first data transmission terminal is one of a D+ terminal and a D− terminal of the first USB interface 211 and the second data transmission terminal is the other one of the D+ terminal and the D− terminal of the first USB interface 211.

The data sending terminal Tx and the data receiving terminal Rx are connected to the first data transmission terminal via the first circuit 212, and the control terminal RST is connected to the second data transmission terminal via the first circuit 212.

Figure 4:
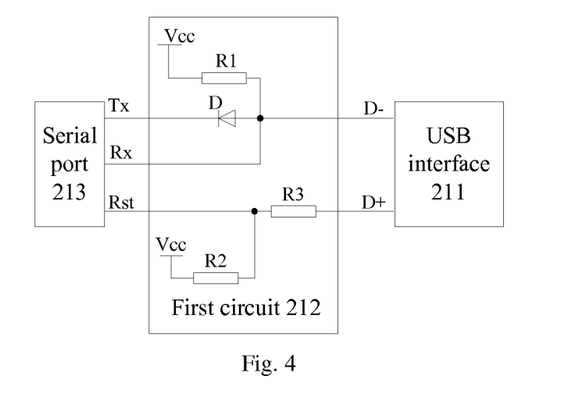
FIG. 4 is a schematic diagram showing a second embodiment of a data transmission line according to the present disclosure.

FIG. 4 is a schematic diagram showing a second embodiment of a data transmission line according to the present disclosure. With reference to FIG. 4, the second embodiment of the data transmission line according to the present disclosure will be described as follows.

A specific structure of the first circuit 212 of the data transmission line shown in FIG. 3 is provided in the second embodiment of the data transmission line, i.e., the first circuit 212 includes a diode D, a first pull-up resistor R1, a second pull-up resistor R2 and a current-limiting resistor R3. Connection relationship between the serial port 213 and the terminal equipment 22 and connection relationship between the first USB interface 211 and the electronic signature token 20 are the same with those in the first embodiment, which are omitted herein.

The diode D has a positive electrode connected with the first data transmission terminal and a negative electrode connected with the data sending terminal Tx of the serial port 213. The diode D allows a data transmission in one direction between the first data transmission terminal and the data sending terminal Tx and prevents a data transmission in the other direction between the first data transmission terminal and the data sending terminal Tx.

The first pull-up resistor R1 has a first terminal connected with a high level Vcc and a second terminal connected with the first data transmission terminal.

The second pull-up resistor R2 has a first terminal connected with the high level Vcc and a second terminal connected with the current-limiting resistor R3.

The current-limiting resistor R3 has a first terminal connected with the control terminal Rst of the serial port 213 and the second terminal of the second pull-up resistor R2 respectively, and a second terminal connected with the second data transmission terminal.

Figure 5:
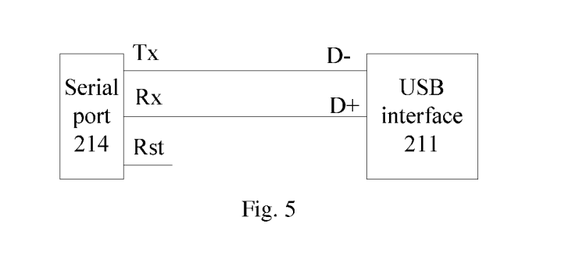
FIG. 5 is a schematic diagram showing a third embodiment of a data transmission line according to the present disclosure.

FIG. 5 is a schematic diagram showing a third embodiment of a data transmission line according to the present disclosure. With reference to FIG. 5, the third embodiment of the data transmission line according to the present disclosure will be described as follows.

In the third embodiment of the data transmission line, the second terminal of the data transmission line 21 connected with the terminal equipment 22 is a serial port 214, and the data information and control information output from the terminal equipment 22 to the serial 214 is in consistent with the serial full-duplex communication protocol, i.e., both the data information and the control information can be transmitted via the Tx/Rx.

The serial port 214 includes a data sending terminal Tx and a data receiving terminal Rx, the first USB interface 211 includes a first data transmission terminal and a second data transmission terminal, and the first data transmission terminal is one of a D+ terminal and a D− terminal of the first USB interface 211 and the second data transmission terminal is the other one of the D+ terminal and the D− terminal of the first USB interface 211.

The sending terminal Tx of the serial port 214 is connected with the first data transmission terminal and the receiving terminal Rx of the serial port 214 is connected with the second data transmission terminal.

Figure 6:
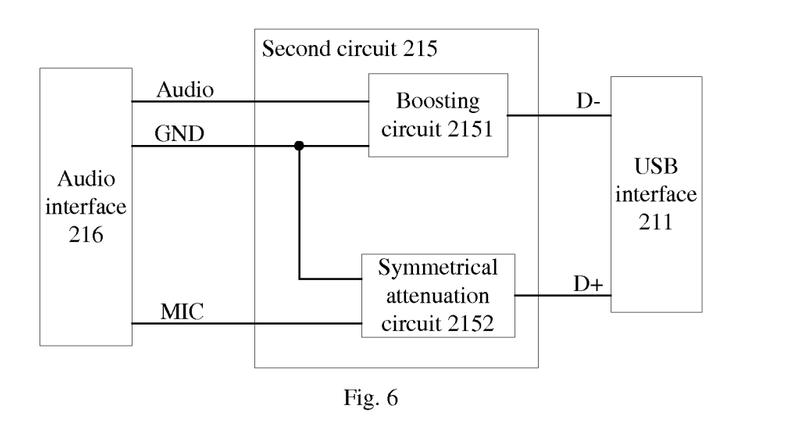
FIG. 6 is a schematic diagram showing a fourth embodiment of a data transmission line according to the present disclosure.

FIG. 6 is a schematic diagram showing a fourth embodiment of a data transmission line according to the present disclosure. With reference to FIG. 6, the fourth embodiment of the data transmission line according to the present disclosure will be described as follows.

In the fourth embodiment of the transmission line, the second terminal of the data transmission line 21 connected with the terminal equipment 22 is an audio interface 216, and the data information and control information output from the terminal equipment 22 to the audio interface 216 is in consistent with the audio transmission protocol, i.e., a branch circuit connected with an Audio terminal transmits information sent from the terminal equipment to the electronic signature token and a branch circuit connected with a MIC terminal transmits information sent from the electronic signature token to the terminal equipment.

In the fourth embodiment of the transmission line, the data transmission line 21 includes an audio interface 216, a first USB interface 211 and a second circuit 215 connected with the audio interface 216 and the first USB interface 211 respectively. The audio interface 216 includes a channel output terminal (Audio) and a microphone terminal (MIC), the first USB interface 211 includes a first data transmission terminal and a second data transmission terminal, the first data transmission terminal is one of a D+ terminal and a D− terminal of the first USB interface 211 and the second data transmission terminal is the other one of the D+ terminal and the D− terminal of the first USB interface 211.

The channel output terminal receives audio information sent from the terminal equipment 22, and then the audio information sent from the terminal equipment 22 is amplified and transmitted to the first data transmission terminal by the second circuit 215.

The second data transmission terminal receives audio information sent from the electronic signature token 20, and then the audio information sent from the electronic signature token 20 is attenuated and transmitted to the microphone terminal by the second circuit 215.

The second circuit 215 includes a boosting circuit 2151 and a symmetrical attenuation circuit 2152.

The boosting circuit 2151 has an input terminal connected with the channel output terminal, a ground terminal connected with a ground terminal (GND) of the audio interface 216 and an output terminal connected with the first data transmission terminal of the first USB interface 211. The boosting circuit 2151 may be configured as a boosting transformer, an amplifier or an amplifying circuit, and an inner structure of the boosting circuit 2151 is omitted herein.

The symmetrical attenuation circuit 2152 has an input terminal connected with the second data transmission terminal of the first USB interface 211, an output terminal connected with the ground terminal (GND) and the microphone terminal of the audio interface 216 respectively. Information received by the second data transmission terminal is divided into two signals, each of the two signals is symmetrically attenuated and the attenuated signals are output by two output terminals respectively. The symmetrical damping circuit 2152 may be configured as a circuit including a resistor and two capacitors, in which one of the two capacitors has a first terminal connected with GND and a second terminal connected with a terminal of the resistor and a first terminal of the other one of the two capacitors, and the other one of the two capacitors has a second terminal connected with the MIC terminal. The symmetrical attenuation circuit 2152 may be configured as other circuit structures, which are omitted herein.

Both the first terminal and the second terminal of the data transmission line according to embodiments of the present disclosure may be configured as USB interfaces, the two USB interfaces may be the same type or different types of USB interfaces, such as a standard USB interface, a MINI USB interface and a MICRO USB interface. The structure of the data transmission line having two terminals configured as USB interfaces will not be described herein.

Figure 7:
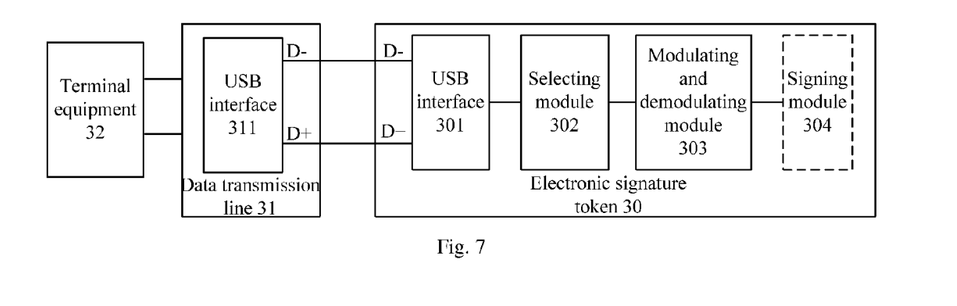
FIG. 7 is a schematic diagram showing a second embodiment of a system for transmitting data by using a USB interface according to the present disclosure.

FIG. 7 is a schematic diagram showing a second embodiment of a system for transmitting data by using a USB interface according to the present disclosure. With reference to FIG. 7, the second embodiment of the system for transmitting data by using a USB interface according to the present disclosure will be described as follows.

In the second embodiment of the system for transmitting data by using a USB interface, the system includes a terminal equipment 32, a data transmission line 31 and an electronic signature token 30.

The data transmission line 31 has a first terminal configured as a first USB interface 311 connected with the electronic signature token 30 and a second terminal connected with the terminal equipment 32. The data transmission line 31 is configured to transmit information from the terminal equipment 32 to the electronic signature token 30 directly. While transmitting the information, the data transmission line 31 does not perform a protocol conversion on the information, but directly transmit the information via data lines connected with corresponding interfaces therein. The second terminal of the data transmission line 31 connected with the terminal equipment 32 may be configured as an interface matched with an interface of the terminal equipment 32.

The electronic signature token 30 includes a second USB interface 301, a selecting module 302 connected with the second USB interface 301 and a modulating and demodulating module 303 connected with the selecting module 302.

The selecting module is configured to detect the information received by the second USB interface 301 and to determine a data transmission protocol type used to transmit the information according to the detected information.

The modulating and demodulating module 303 is configured to demodulate the information in a demodulation mode matched with the data transmission protocol type so as to obtain demodulated data.

In addition, the modulating and demodulating module 303 of the electronic signature token 30 is further configured to modulate data to be sent using a modulation mode matched with the data transmission protocol type to obtain information to be sent and to transmit the information to be sent to the terminal equipment 32 directly via the data transmission line 31. The data to be sent may be a request and other identity information needed to be uploaded by the electronic signature token 30 or signature data generated by the electronic signature token 30 according to the demodulated data.

In an embodiment of the present disclosure, the electronic signature token 30 further includes a signing module 304, and the signing module 304 is configured to sign the demodulated data to obtain the data to be sent.

Figure 8:
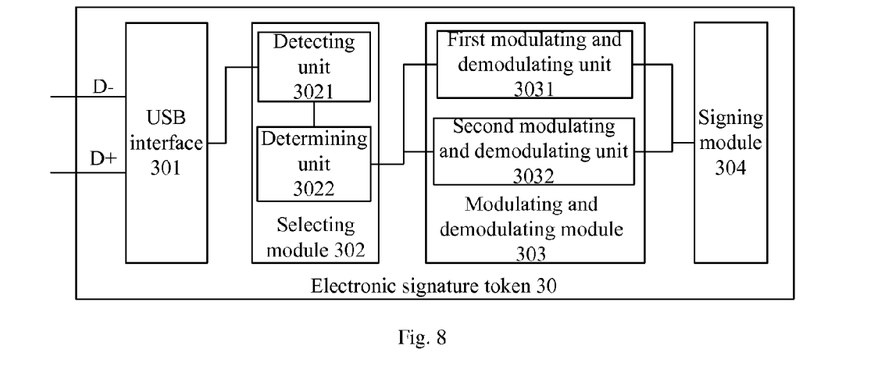
FIG. 8 is a schematic diagram showing a fourth embodiment of an electronic signature token according to the present disclosure.

FIG. 8 is a schematic diagram showing a fourth embodiment of an electronic signature token according to the present disclosure. With reference to FIG. 8, the fourth embodiment of the electronic signature token according to the present disclosure will be described as follows.

In the fourth embodiment of the electronic signature token, specific structures of the selecting module 302 and the modulating and demodulating module 303 in the electronic signature token includes 30 are provided. Structures and connection relationships of other components in the electronic signature token 30 are the same with those in the electronic signature token 20 shown in FIG. 2, and thus only the structures of the selecting module 302 and the modulating and demodulating module 303 will be described in the following and the structures other components will not be described herein.

The selecting module 302 includes a detecting unit 3021 and a determining unit 3022.

The detecting unit 3021 is configured to detect a waveform of the information. For example, the detecting unit 3021 may use a waveform detecting method used by the electronic signature token 20 shown in FIG. 2 to determine whether the waveform of the information is a square waveform or a triangular waveform.

The determining unit 3022 is configured to determine the used data transmission protocol type according to the waveform of the information detected by the detecting unit 3021. In the embodiment, the data transmission protocol type may be a serial communication protocol, an audio transmission protocol or a USB transmission protocol. Specifically, if the determining unit 3022 determines that the waveform of the information is a triangular waveform, such as a sine waveform or a cosine waveform, it is determined that the used data transmission protocol type is the audio transmission protocol and the information received by the second USB interface 301 is output to a modulating and demodulating unit supporting the audio transmission protocol; if the determining unit 3022 determines that the waveform of the information is a square wave, a bit rate of the square wave is further detected, and if the bit rate of the square wave is between 9600 bps and 19200 bps, it is determined that the used data transmission protocol type is the serial communication protocol and the information received by the second USB interface 301 is output to a modulating and demodulating unit supporting the serial communication protocol; if the determining unit 3022 detects that the bit rate of the square wave is more than or equal to 100 kbps or beyond a range from 9600 bps to 19200 bps, it is determined that the used data transmission protocol type is the USB transmission protocol and the information received by the second USB interface 301 is output to a modulating and demodulating unit supporting the USB transmission protocol.

After determining that the used data transmission protocol type is the serial communication protocol, the determining unit 3022 further determines a type of the serial communication protocol by determining whether one of the two signal transmission terminals of the second USB interface 301 receives the control information RST. For example, if the determining unit 3022 determines that one of the two signal transmission terminals of the second USB interface 301 receives the control information RST and the other one of the two signal transmission terminals receives data information, the used data transmission protocol type is determined as the serial half-duplex communication protocol, and the information received by the second USB interface 301 is output to a modulating and demodulating unit supporting the serial half-duplex communication protocol; if the determining unit 3022 determines that one of the two signal transmission terminals of the second USB interface 301 receives the data information but the other one of the two signal transmission terminals does not receive the control information RST, the used data transmission protocol type is determined as the serial full-duplex communication protocol, and the information received by the second USB interface 301 is output to a modulating and demodulating unit supporting the serial full-duplex communication protocol. The difference between the fourth embodiment and the first embodiment is that, the determining module 3022 in the fourth embodiment uses software instead of hardware switches or circuits to implement switching of the modulating and the demodulating units.

In the fourth embodiment of the electronic signature token, the modulating and demodulating module 303 includes a first modulating and demodulating unit 3031 and a second modulating and demodulating unit 3032. The first modulating and demodulating unit 3031 supports one of the serial full-duplex communication protocol, the serial half-duplex communication protocol, the audio transmission protocol and the USB transmission protocol. The second modulating and demodulating unit 3032 supports one of the serial full-duplex communication protocol, the serial half-duplex communication protocol, the audio transmission protocol and the USB transmission protocol. The first modulating and demodulating unit 30131 and the second modulating and demodulating module 3032 supports different data transmission protocol types.

The first modulating and demodulating unit 3031 demodulates the received information by using the data transmission protocol type supported by itself and outputs the demodulated data to the signing module 304. The first modulating and demodulating unit 3031 also modulates the signature data output by the signing module 304 to obtain the information to be sent and transmits the information to the determining unit 3022.

The second modulating and demodulating unit 3032 demodulates the received information by using the data transmission protocol type supported by itself and outputs the demodulated data to the signing module 304. The second modulating and demodulating unit 3032 also modulates the signature data output by the signing module 304 to obtain the information to be sent and transmits the information to the determining unit 3022.

In the fourth embodiment of the electronic signature token as shown in FIG. 8, the electronic signature token 30 includes two modulating and demodulating units configured to send, receive and process information in two kinds of data transmission protocol types.

In a fifth embodiment of the electronic signature token, the electronic signature token 30 includes three modulating and demodulating units, i.e., the electronic signature token 30 further includes a third modulating and demodulating unit, besides the first modulating and demodulating unit 3031 and the second modulating and demodulating unit 3032. The first modulating and demodulating unit 3031 supports the USB transmission protocol, the second modulating and demodulating unit 3032 supports the audio transmission protocol and the third modulating and demodulating unit supports the serial half-duplex communication protocol. The third modulating and demodulating unit demodulates the received information by using the serial half-duplex communication protocol supported by itself and outputs the demodulated data to the signing module 304. The third modulating and demodulating unit also modulates the signature data output by the signing module 304 to obtain the information to be sent and transmits the information to the determining unit 3022.

In a sixth embodiment of the electronic signature token, the electronic signature token 30 includes three modulating and demodulating units, i.e., the electronic signature token 30 further includes a fourth modulating and demodulating unit, besides the first modulating and demodulating unit 3031 and the second modulating and demodulating unit 3032. The first modulating and demodulating unit 3031 supports the USB transmission protocol, the second modulating and demodulating unit 3032 supports the audio transmission protocol, and the fourth modulating and demodulating unit supports the serial full-duplex communication protocol. The fourth modulating and demodulating unit demodulates the received information by using the serial full-duplex communication protocol supported by itself and outputs the demodulated data to the signing module 304. The fourth modulating and demodulating unit also modulates the signature data output by the signing module 304 to obtain the information to be sent and transmits the information to the determining unit 3022.

In a seventh embodiment of the electronic signature token, the electronic signature token 30 includes four modulating and demodulating units, i.e., the electronic signature token 30 further includes a fifth modulating and demodulating unit and a sixth modulating and demodulating unit, besides the first modulating and demodulating unit 3031 and the second modulating and demodulating unit 3032. The first modulating and demodulating unit 3031 supports the USB transmission protocol, the second modulating and demodulating unit 3032 supports the audio transmission protocol, the fifth modulating and demodulating unit supports the serial half-duplex communication protocol and the sixth modulating and demodulating unit supports the serial full-duplex communication protocol. The fifth modulating and demodulating unit demodulates the received information by using the serial half-duplex communication protocol supported by itself and outputs the demodulated data to the signing module 304. The fifth modulating and demodulating unit also modulates the signature data output by the signing module 304 to obtain the information to be sent and transmits the information to the determining unit 3022. The sixth modulating and demodulating unit demodulates the received information by using the serial full-duplex communication protocol supported by itself and outputs the demodulated data to the signing module 304. The sixth modulating and demodulating unit also modulates the signature data output by the signing module 304 to obtain the information to be sent and transmits the information to the determining unit 3022.

In the second embodiment of the system for transmitting data by using a USB interface according to the present disclosure, the data transmission line 31 may be configured as the data transmission lines 21 shown in FIGS. 3-6. The structure and function of the data transmission line 31 may be referred to above embodiments, and embodiments of the data transmission line 31 in the second embodiment of the system for transmitting data by using a USB interface are omitted herein.

In above embodiments of the present disclosure, with the data transmission line and by using the USB interface of the electronic signature token, data supporting different transmission protocols is transmitted to the electronic signature token through the terminals D+ and D− of the USB interface, and thus universality and flexibility of the electronic signature token is improved. Moreover, during the data transmission, with similarity of transmitting data in different transmission protocols and with the terminals D+ and D− of the USB interface, corresponding terminals of different types of interfaces are connected with the terminal D+ or the terminal D− of the USB interface directly via the circuit in the data transmission line, and the information in different transmission protocols can be transmitted by using the USB interface without a complex protocol conversion, thus reducing a cost and complexity of the hardware, simplifying a structure, and making it convenient to implement. For example, the electronic signature token according to embodiments of the present disclosure can interact with a POS machine having a serial port, and the electronic signature token according to embodiments of the present disclosure also can interact with a mobile phone via an audio interface of the mobile phone, thus improving the universality of the electronic signature token.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions. This should be understood by those skilled in the art which embodiments of the present disclosure belong to.

It is understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the phrases throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

The invention claimed is:

1. A system for transmitting data by using a USB interface, comprising:
    a terminal equipment;
    a data transmission line, having a first terminal configured as a first USB interface and a second terminal configured as an interface adapted for connecting with the terminal equipment, and configured to transmit information from the terminal equipment directly; and
    an electronic signature token, comprising:
        a second USB interface, configured to be connected with the first USB interface to receive the information from the terminal equipment;
        a security chip, connected with the second USB interface and configured to detect the information received by the second USB interface, to determine a data transmission protocol type used to transmit the information according to the information, to generate control information according to the data transmission protocol type, and to demodulate the received information using a demodulation mode matched with the data transmission protocol type to obtain demodulated data;
        a gate circuit, connected with the second USB interface and the security chip respectively, and configured to receive the control information from a control terminal of the security chip, and to connect the second USB interface with a modulating and demodulating terminal supporting the data transmission protocol type in the security chip according to the control information.

2. The system according to claim 1, wherein the security chip is further configured to modulate data to be sent using a modulation mode matched with the data transmission protocol type to obtain information to be sent, and to transmit the information to be sent to the terminal equipment directly via the connected gate circuit and the data transmission line.

3. The system according to claim 2, wherein the security chip comprises:
    a signing module, configured to sign the demodulated data to obtain the data to be sent, in which the data to be sent comprises signature data.

4. The system according to claim 1, wherein the security chip comprises:
    a detecting module, configured to detect the information received by the second USB interface and to obtain a waveform of the information; and
    a determining module, configured to determine the data transmission protocol type used to transmit information according to the waveform of the information detected by the detecting module, and to output the control information to the gate circuit via the control terminal according to the data transmission protocol type,
    in which the data transmission protocol type is a serial communication protocol, an audio transmission protocol or a USB transmission protocol.

5. The system according to claim 4, wherein the serial communication protocol comprises the serial full-duplex communication protocol and the serial half-duplex communication protocol, the second USB interface comprises a first signal transmission terminal and a second signal transmission terminal, the first signal transmission terminal is one of a D+ terminal and a D− terminal of the second USB interface and the second signal transmission terminal is the other one of the D+ terminal and the D− terminal of the second USB interface; and
    wherein the determining module is further configured to determine a type of the serial communication protocol by determining whether one of the first signal transmission terminal and the second signal transmission terminal receives the control information, in which
    if one of the first signal transmission terminal and the second signal transmission terminal receives the control information and the other one of the first signal transmission terminal and the second signal transmission terminal receives data information, the serial communication protocol is determined as the serial half-duplex communication protocol;
    if one of the first signal transmission terminal and the second signal transmission terminal receives the data information but the other one of the first signal transmission terminal and the second signal transmission terminal does not receive the control information, the serial communication protocol is determined as the serial full-duplex communication protocol.

6. The system according to claim 4, wherein the serial communication protocol is the serial half-duplex communication protocol, the interface adapted for connecting with the terminal equipment is a serial port, the data transmission line further comprises a first circuit connected with the serial port and the first USB interface respectively, the first USB interface comprises a first data transmission terminal and a second data transmission terminal, the first data transmission terminal is one of a D+ terminal and a D− terminal of the first USB interface and the second data transmission terminal is the other one of the D+ terminal and the D− terminal of the first USB interface; and
    wherein the serial port comprises a data sending terminal, a data receiving terminal and a control terminal, the data sending terminal and the data receiving terminal are connected to the first data transmission terminal via the first circuit, and the control terminal is connected to the second data transmission terminal via the first circuit.

7. The system according to claim 6, wherein the first circuit comprises:
- a diode, having a positive electrode connected with the first data transmission terminal and a negative electrode connected with the data sending terminal;
- a first pull-up resistor, having a first terminal connected with a high level and a second terminal connected with the first data transmission terminal;
- a second pull-up resistor, having a first terminal connected with a high level; and
- a current-limiting resistor, having a first terminal connected with the control terminal of the serial port and a second terminal of the second pull-up resistor respectively, and a second terminal connected with the second data transmission terminal.

8. The system according to claim 4, wherein the serial communication protocol is the serial full-duplex communication protocol, and the interface adapted for connecting with the terminal equipment is a serial port;
- the serial port comprises a sending terminal and a receiving terminal, the first USB interface comprises a first data transmission terminal and a second data transmission terminal, the first data transmission terminal is one of a D+ terminal and a D− terminal of the first USB interface and the second data transmission terminal is the other one of the D+ terminal and the D− terminal of the first USB interface; and
- the sending terminal is connected with the first data transmission terminal, and the receiving terminal is connected with the second data transmission terminal.

9. The system according to claim 4, wherein the data transmission protocol type is the audio transmission protocol, the interface adapted for connecting with the terminal equipment is an audio interface, the data transmission line further comprises a second circuit connected with the audio interface and the first USB interface respectively;
- the audio interface comprises a channel output terminal and a microphone terminal, the first USB interface comprises a first data transmission terminal and a second data transmission terminal, the first data transmission terminal is one of a D+ terminal and a D− terminal of the first USB interface and the second data transmission terminal is the other one of the D+ terminal and the D− terminal of the first USB interface;
- the channel output terminal is configured to receive audio information from the terminal equipment, and the second circuit is configured to amplify the audio information sent from the terminal equipment and to transmit amplified audio information to the first data transmission terminal;
- the second data transmission terminal is configured to receive audio information from the electronic signature token, and the second circuit is configured to attenuate the audio information sent from the electronic signature token and to transmit attenuated audio information to the microphone terminal.

10. The system according to claim 1, wherein the gate circuit comprises at least two gate sub-circuits and each gate sub-circuit comprises two controllable switches; and
- a controlled terminal of the controllable switch is connected with the control terminal of the security chip.

11. A system for transmitting data by using a USB interface, comprising:
- a terminal equipment;
- a data transmission line, having a first terminal configured as a first USB interface and a second terminal configured as an interface adapted for connecting with the terminal equipment, and configured to transmit information from the terminal equipment directly; and
- an electronic signature token, comprising:
  - a second USB interface, configured to be connected with the first USB interface to receive the information from the terminal equipment;
  - a selecting module, connected with the second USB interface and configured to detect the information received by the second USB interface and to determine a data transmission protocol type used to transmit the information according to the information;
  - a modulating and demodulating module, connected with the selecting module and configured to demodulate the information in a demodulation mode matched with the data transmission protocol type and to obtain demodulated data.

12. The system according to claim 11, wherein the modulating and demodulating module is further configured to modulate data to be sent using a modulation mode matched with the data transmission protocol type to obtain information to be sent and to transmit the information to be sent to the terminal equipment directly via the data transmission line.

13. The system according to claim 12, wherein the electronic signature token further comprises:
- a signing module, configured to sign the demodulated data to obtain the data to be sent, in which the data to be sent comprises signature data.

14. The system according to claim 11, wherein the selecting module comprises:
- a detecting unit, configured to detect a waveform of the information;
- a determining unit, configured to determine the data transmission protocol type used to transmit the information according to the waveform of the information detected by the detecting module, in which the data transmission protocol type is a serial communication protocol, an audio transmission protocol or a USB transmission protocol.

15. The system according to claim 14, wherein the serial communication protocol comprises the serial full-duplex communication protocol and the serial half-duplex communication protocol, the second USB interface comprises a first signal transmission terminal and a second signal transmission terminal, the first signal transmission terminal is one of a D+ terminal and a D− terminal of the second USB interface and the second signal transmission terminal is the other one of the D+ terminal and the D− terminal of the second USB interface; and
- wherein the determining unit is further configured to determine a type of the serial communication protocol by determining whether one of the first signal transmission terminal and the second signal transmission terminal receives the control information, in which
  - if one of the first signal transmission terminal and the second signal transmission terminal receives the control information and the other one of the first signal transmission terminal and the second signal transmission terminal receives data information, the serial communication protocol is determined as the serial half-duplex communication protocol;
  - if one of the first signal transmission terminal and the second signal transmission terminal receives data information but the other one of the first signal transmission terminal and the second signal transmission terminal does not receive the control information, the serial communication protocol is determined as the serial full-duplex communication protocol.

16. The system according to claim 14, wherein the serial communication protocol is the serial half-duplex communication protocol, the interface adapted for connecting with the terminal equipment is a serial port, and the data transmission line further comprises a first circuit connected with the serial port and the first USB interface respectively;
- the serial port comprises a data sending terminal, a data receiving terminal and a control terminal, the first USB interface comprises a first data transmission terminal and a second data transmission terminal, the first data transmission terminal is one of a D+ terminal and a D− terminal of the first USB interface and the second data transmission terminal is the other one of the D+ terminal and the D− terminal of the first USB interface;
- the data sending terminal and the data receiving terminal are connected to the first data transmission terminal via the first circuit;
- the control terminal is connected to the second data transmission terminal via the first circuit.

17. The system according to claim 16, wherein the first circuit comprises:
- a diode, having a positive electrode connected with the first data transmission terminal and a negative electrode connected with the data sending terminal;
- a first pull-up resistor, having a first terminal connected with a high level and a second terminal connected with the first data transmission terminal;
- a second pull-up resistor, having a first terminal connected with a high level; and
- a current-limiting resistor, having a first terminal connected with the control terminal of the serial port and a second terminal of the second pull-up resistor respectively, and a second terminal connected with the second data transmission terminal.

18. The system according to claim 14, wherein the serial communication protocol is the serial full-duplex communication protocol, and the interface adapted for connecting with the terminal equipment is a serial port;
- the serial port comprises a sending terminal and a receiving terminal, the first USB interface comprises a first data transmission terminal and a second data transmission terminal, the first data transmission terminal is one of a D+ terminal and a D− terminal of the first USB interface and the second data transmission terminal is the other one of the D+ terminal and the D− terminal of the first USB interface;
- the sending terminal is connected with the first data transmission terminal, and the receiving terminal is connected with the second data transmission terminal.

19. The system according to claim 14, wherein the data transmission protocol type is the audio transmission protocol, the second terminal of the data transmission line connected with the terminal equipment is an audio interface, and the data transmission line further comprises a second circuit connected with the audio interface and the first USB interface respectively;
- the audio interface comprises a channel output terminal and a microphone terminal, the first USB interface comprises a first data transmission terminal and a second data transmission terminal, the first data transmission terminal is one of a D+ terminal and a D− terminal of the first USB interface and the second data transmission terminal is the other one of the D+ terminal and the D− terminal of the first USB interface;
- the channel output terminal is configured to receive audio information from the terminal equipment, and the second circuit is configured to amplify the audio information sent from the terminal equipment and to transmit amplified audio information to the first data transmission terminal;
- the second data transmission terminal is configured to receive audio information from the electronic signature token, and the second circuit is configured to attenuate the audio information sent from the electronic signature token and to transmit attenuated audio information to the microphone terminal.

20. The system according to claim 11, wherein the modulating and demodulating module comprises at least two modulating and demodulating units, each modulating and demodulating unit supports different data transmission protocol types, in which the data transmission protocol types comprise the serial full-duplex communication protocol, the serial half-duplex communication protocol, the audio transmission protocol and the USB transmission protocol.

* * * * *